Jan. 20, 1970   J. B. WAGNER   3,490,793
COUPLING FOR A HOSE
Filed Aug. 16, 1968

Inventor:
John B. Wagner
By Bair, Freeman & Molinare
Attys.

United States Patent Office 3,490,793
Patented Jan. 20, 1970

3,490,793
COUPLING FOR A HOSE
John B. Wagner, 938 North Blvd., Oak Park, Ill. 60301
Filed Aug. 16, 1968, Ser. No. 753,288
Int. Cl. F16l 55/00, 33/00
U.S. Cl. 285—93        4 Claims

ABSTRACT OF THE DISCLOSURE

Coupling for hoses handling relatively high fluid pressures such as used in hydraulic systems, for hydraulic apparatus, for loading hoses, industrial purposes and various other uses. The coupling embodies a cylindrical body having a plurality of internal grooves, a tubular pressure element having a deformable externally grooved end portion and an externally tapered portion, and a tubular coupling member having an enlarged expansion head and a threaded end portion. The body is positioned externally of the hose and the pressure element and the coupling member are positioned internally of the hose. The enlarged head is moved axially to expand the deformable end portion of the pressure element whereby the hose is firmly secured to the coupling.

BACKGROUND AND SUMMARY OF THE INVENTION

This invention relates to couplings for fluid conduits such as a hose used for transferring liquids or gases under pressure or vacuum. Such couplings are utilized for connecting conduits to various apparatus such as in hydraulic systems, hydraulic cylinders, pumps, tanks, hoppers, pipelines and for various industrial purposes.

Recent developments involving the transmission of fluid contemplate employment of conduits and hoses which are capable of handling extremely high pressures. Some hoses have been designed and constructed so as to withstand as high as 50,000 p.s.i. bursting pressure. It has long been a problem to provide couplings of suitable construction for use on hoses handling extremely high fluid pressures and which couplings would remain effectively and sealingly attached to the conduit or hose.

The coupling disclosed in my Patent No. 3,211,476 dated Oct. 12, 1965, represents a substantial and important improvement over couplings of earlier design and the present invention constitutes further important improvements over a coupling as disclosed in my patent as will be hereinafter pointed out.

One of the objects of this invention is to provide an improved coupling for a hose which provides greatly increased gripping force on the hose when it is attached so as to be capable of effective and efficient use with a hose of the type having an extremely high bursting pressure.

Another object is to provide an improved coupling of the character indicated which may be quickly and easily attached to a hose and which is capable of being economically manufactured.

A further object is to provide an improved coupling of the character indicated having index means for indicating that the coupling is firmly secured and attached in proper position on the hose.

Other objects and advantages of this invention will be apparent from the following description taken in connection with the accompanying drawing in which:

DESCRIPTION OF THE PREFERRED EMBODIMENT

Figure 1:
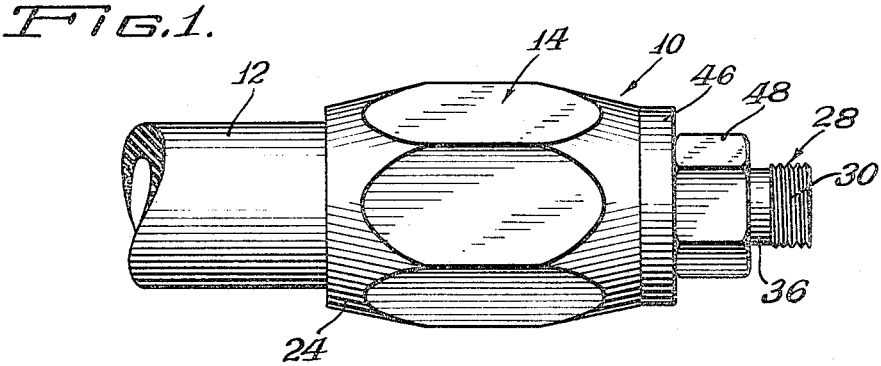
FIGURE 1 is an elevational view of the coupling embodying the present invention shown attached to a hose.
Figure 3:
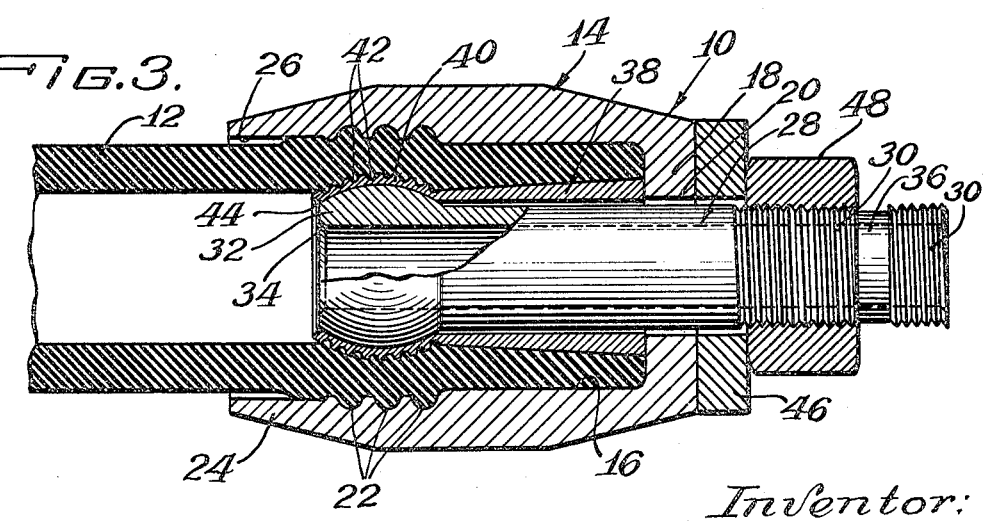
FIGURE 3 is a sectional view similar to FIGURE 2 showing the final position of the various components of the coupling when in assembled and attached relation on the end of a hose.

In the drawing, the coupling embodying the present invention is indicated generally by the reference numeral 10 and as seen in FIGURES 1 and 3 of the drawing is fixedly attached to the end of a hose 12. It is to be understood that the hose may be of any suitable material, such as rubber or synthetic rubber and when the conditions of use require a hose of high bursting pressure such a hose may be of the type having wire strands or wire mesh or fabric embedded therein. It is also to be understood that the coupling may be satisfactorily employed in connection with tubing or pipe formed of suitable metal or synthetic plastic materials.

As may be seen in the drawing, the coupling includes a cup-shaped body 14 which may be formed as a casting or forging or may be machined from bar or rod stock. The body is provided with a cylindrical bore 16 which is approximately equal to the outer diameter of the hose 12 and the body includes an end wall 18, having a central opening 20. The inner cylindrical wall of the bore, adjacent the inner end (opposite the end wall 18) is formed with a multiplicity of circumferential grooves 22 and the innermost end of the body, adjacent to said grooves, is formed with an extension 24, provided a counterbore 26, of a diameter slightly less than the outer diameter of the grooves 22.

Positioned axially within the body 14 is a tubular coupling member 28, having a main shank portion which extends through the opening 20, in the end wall of the coupling body, and the outer end portion of said shank is threaded as indicated at 30. The opposite or inner end of the tubular member is formed with an enlarged portion 32 which is in the form of a segment of a sphere and which constitutes an expansion head. The innermost end of the expansion head of the tubular member is counterbored to provide an inclined, frusto conical surface 34. Preferably, the tubular member 28 is formed of metal and the expansion head 32 is heat treated for hardness. It will be observed that the largest diameter of the expansion head, as may be seen in FIGURE 2 of the drawing, is slightly larger than the inner diameter or bore of the hose 12. Adjacent the outermost end of the threaded portion of the shank of the tubular member is provided an annular groove 36, for purposes which will hereinafter be described.

Figure 2:
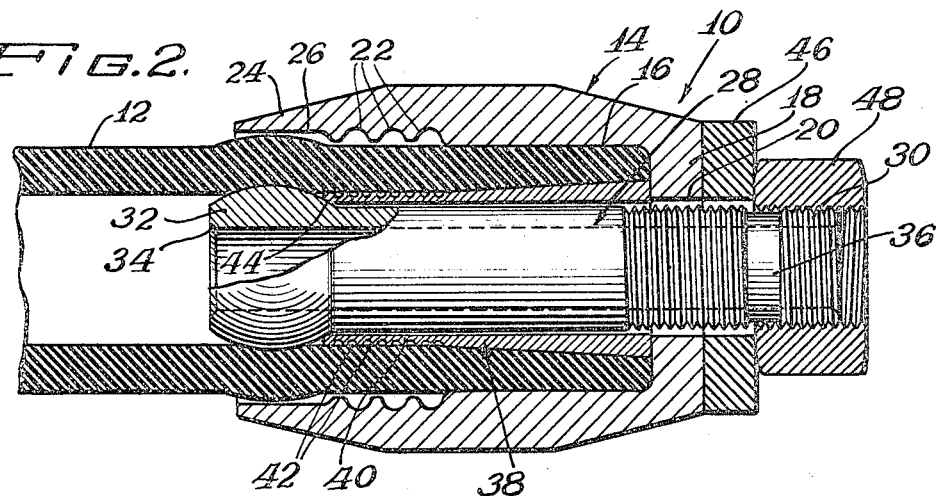
FIGURE 2 is an enlarged axial sectional view showing the various components of the coupling in an initial position with respect to the end of a hose, preparatory to attachment to the hose.

Telescoped over the shank portion of the tubular member 28, is a tubular pressure element 38, the outer diameter of which, initially, at the innermost end, is substantially equal to the inner diameter of the bore of the hose 12, as seen in FIGURE 2 of the drawing. The innermost end portion of the pressure element, as indicated at 40, is formed with a plurality of axially spaced, circumferential grooves 42 which reduces the cross section of metal of said pressure element in the innermost end portion, and the remaining portion or section of the length of said pressure element is tapered and gradually increases in diameter toward its outer end. The major portion of the length of said tapered section of the pressure element is of a diameter slightly greater than the diameter of the bore of the hose 12. The angle of the tapered portion of the pressure element preferably is in the range of 2° to 15°, depending upon the thickness and physical characteristics of the hose to which the coupling is to be applied. As may be seen in the drawing, the outer end of the pressure element, when assembled in the hose and the body 14 in place, abuts against the end wall 18 of said body. The innermost end of the pressure element is counterbored to provide an inclined frusto conical surface 44 for cooperative engagement with and facilitate movement over the spherical outer surface of the expansion head 32 of the coupling member 28.

The pressure element may be formed of any suitable material, preferably one possessing ductile characteristics, such as annealed tubing which is capable of withstanding high fluid pressures. The inner portion of the pressure element 38, containing grooves 42, is transaxially deformable as will hereinafter be pointed out and is rendered more readily deformable by the reduction in its cross sectional mass by the provision of the circumferential grooves 42. For certain uses where the coupling is to be employed in connection with hoses or conduits handling medium or low fluid pressures, said pressure element may be formed of copper, bronze, brass or synthetic material.

In applying the coupling to a hose tubing or pipe, the tubular coupling member 28 is first telescoped into the pressure element 38, and the two parts are pressed into the end of the hose as seen in FIGURE 2 of the drawing with the expansion head 32 slightly deforming the hose outwardly as it is being moved to the desired position, and the pressure element likewise serving to slightly expand the end portion of the hose by reason of the tapered portion thereof. The sub-assembly of the member 28 and pressure element 38 are pressed into the hose until the end of the pressure element is substantially flush with the end of the hose. The body 14 is then placed over the end of the hose with the shank portion of the tubular member 28 extending through the opening 20 in the end wall of the body as seen in FIGURE 2. Because of the tapered portion of the pressure element, the outside diameter of the end of the hose is slightly enlarged and the body when being placed in proper position will be forced over the end of the hose, compressing the body of the hose and displacing some of the volume thereof, thus creating a substantial friction grip on the inner and outer walls of the hose as may be seen in FIGURES 2 and 3 of the drawing. When the parts are so assembled, the circumferential grooves 22 in the inner wall of the bore of the body are in registration with the plurality of grooves 42 in the pressure element. A washer 46 is then placed over the projecting threaded end portion of the tubular member 28 and a nut 48 is threaded on said member. By turning the nut and providing a reaction force through the washer 46, against the end of the body 14, the tubular member 28 is moved axially outward with respect to the coupling body, causing the expansion head 32, acting on the end of the deformable pressure element, to crowd said portion containing grooves 42 in a radial outward direction. Such axial movement of the tubular member causes the deformable end portion of the pressure element to follow the contour of the outer surface of the expansion head and compresses the wall of the hose between the pressure element and the body so as to cause portions of the material of the hose to fill the grooves 22 in the body and the grooves 42 in the pressure element as seen in FIGURE 3 of the drawings. Simultaneously with such compression of the wall of the hose, in the zone of said sets of grooves, material of the wall of the hose surrounding the tapered portion is also further compressed and the density of the rubber increased so as to exert a greatly increased binding or gripping pressure between the wall of the hose and the tapered portion of the pressure element and the inner wall of the bore of the body. Thus the end of the hose becomes firmly gripped under substantial pressure between the cooperating elements of the coupling and insures an efficient, sealed connection of the coupling to the hose in a substantially permanent manner, as may be seen in FIGURE 3 of the drawings. When the coupling is in its attached position on the hose, the compressive forces exerted against the wall of the hose between the two sets of grooves displaces a portion of the body of the rubber in an inwardly direction of said grooves and causes it to expand radially outward against the wall of the counterbore 26 of the body. Thus the extension 24 on the inner end of the body serves to accommodate and protect the portion of the hose that becomes enlarged due to displacement of the material of the hose incident to the gripping action of the cooperating parts of the coupling. When the elements of the coupling are connected to the hose as seen in FIGURE 3 of the drawings, with the nut 48 tightly pressing against the washer 46 and which in turn presses against the end of the housing, all of the elements of the coupling are then locked in their final assembled relation to the end of the hose.

It is to be understood that the coupling member, when initially applied to the end of the hose as seen in FIGURE 2 of the drawings, may be adjusted to its final operative position for firm attachment to the hose by any other suitable apparatus capable of moving the tubular member 28 in an outward position from that seen in FIGURE 2 to the position seen in FIGURE 3. For example, when a coupling is of substantial size for use with hoses of relatively large diameter, a suitable hydraulic device may be attached in a suitable manner so as to cause such outward axial movement of the tubular member 28 to its final locking position for securement of the coupling to the hose as seen in FIGURE 3 of the drawings.

The annular groove 36 in the threaded outer end portion of the tubular member 28 serves a dual purpose. The groove is preferably so located that when the tubular member 28 has been moved outwardly to a position for securing the coupling to the hose, the innermost shoulder of the groove 36 assumes a positive flush with the outer face of the nut as seen in FIGURE 3 and thus serves as an index feature to indicate that the coupling elements have attained a desired position of adjustment for firm and secure attachment of the coupling to the hose. The groove 36 also is used for the reception of an O-ring to serve as a seal against leakage of fluid when the coupling and the attached hose are connected to other apparatus or devices.

It will be apparent that the coupling embodying the present invention provides a positive, firm and fixed connection to the end portion of a hose, tube or pipe and eliminates the possibility of fluid leaks in the coupling connection. The design and construction of the coupling is such as to permit use in handling relatively high fluid pressures such as substantially the maximum pressure range for which the respective hoses, tubing or pipe are designed to accommodate. It is to be understood that the thickness of the wall of the body of the coupling may be varied for different size couplings and for couplings for hoses handling different ranges of fluid pressure.

It will be apparent that due to the novel design and construction of my coupling, when it is installed, provides a maximum gripping and squeezing pressure on the hose and which will remain constant because of the expansion head of the tubular member always remaining in its fixed position of adjustment. It will also be apparent that couplings embodying the present invention, depending on the size, may be quickly and easily applied in the field by the use of relatively simple tools. Moreover, the construction is such that the coupling is capable of reuse by stripping it from the end of a hose and reapplying it to another or new section of hose and which will only necessitate the use of a new pressure element.

Wherever in the claims the term "hose" is referred to, it is intended that such term be accorded a meaning to include various types of hoses now available, including those of reinforced type as well as tubing and pipe.

Although I have herein shown and described a certain preferred embodiment of my invention, manifestly

I Claim:
1. In a hose coupling comprising a body having a cylindrical chamber and an end wall for telescoping over an end of a hose, a tubular coupling member extending through an opening in the end wall of the body, the inner end of said member being formed with an enlarged expansion head adapted initially to be telescoped into the bore of the hose, a portion of said member, opposite said head, being threaded, and a tubular pressure element mounted on said coupling member and telescoped into the bore of the hose and having an inner end portion of deformable material, said inner end portion being initially positioned adjacent said head and the other end abutting the end wall of the body, whereby means coacting with said threaded portion of the coupling member, externally of the body, rotates and moves said coupling member axially outward with respect to said body, causing said head to move into said deformable end portion and a correspondingly aligned portion of the hose, causing the aligned portion of the hose to be firmly squeezed and pressed against the cylindrical wall of the chamber of said body and said member being retained in said pressure element by the deformed portion thereof and serving to firmly secure said coupling in fixed, sealed relation to the end portion of the hose with the body, coupling member and pressure element in fixed relation to each other, improvement wherein the inner cylindrical wall of said chamber and the external surface of said pressure element, outwardly of the deformable inner end portion, being dimensionally related to provide an axially tapering annular space, converging toward the end wall of the body, which is less than the thickness of the wall of the hose to which the coupling is applied, the inner cylindrical wall of said chamber being provided with a plurality of grooves located in transaxial registration with said deformable inner end portion of said pressure element, into which the material of the hose is caused to flow incident to affixing the coupling to the hose, the outer surface of the deformable inner end portion being provided with a plurality of grooves, whereby the inner and outer surfaces of the portion of the hose registering with the two sets of grooves are firmly gripped and serve to aid in firmly securing the coupling and hose in assembled relation.

2. In a coupling as defined in claim 1 wherein said dimensional relationship between the body and pressure element comprises a portion of the pressure element, outwardly of said deformable inner end portion, having a tapered surface increasing in diameter toward the end wall of the body and the outer diameter of said tapered portion being greater than the normal internal diameter of the hose to which the coupling is applied.

3. In a coupling as defined in claim 1, characterized by the body being provided at its open end with an extension beyond said grooves for accommodating material of the hose being displaced by gripping in the zone of said grooves.

4. In a hose coupling as in claim 1, characterized by index means on the outer portion of the coupling member adapted to register with the outer face of the nut when the coupling is affixed in final assembled relation to the hose, said index means comprising a groove in the coupling member.

References Cited

UNITED STATES PATENTS

| | | | |
|---|---|---|---|
| 1,942,518 | 1/1934 | Protin | 285—93 X |
| 2,146,756 | 2/1939 | Miller | 285—258 |
| 2,216,839 | 10/1940 | Hoffman | 285—258 |
| 2,228,018 | 1/1941 | Scholtes | 285—258 X |
| 2,476,480 | 7/1949 | Burckle et al. | 285—93 X |
| 2,485,976 | 10/1949 | Main | 285—256 X |
| 2,550,583 | 4/1951 | Millar | 285—258 |
| 3,211,476 | 10/1965 | Wagner | 285—258 |
| 3,245,699 | 4/1966 | Peterman | 285—256 |
| 3,325,192 | 6/1967 | Sullivan | 285—93 |

THOMAS F. CALLAGHAN, Primary Examiner

U.S. Cl. X.R.

285—258